June 19, 1962 S. B. NISSLEY 3,039,677
SHEAR PUMPS

Filed April 15, 1960 2 Sheets-Sheet 1

INVENTOR.
SAMUEL B. NISSLEY
BY
ATTORNEY

INVENTOR.
SAMUEL B. NISSLEY
BY
ATTORNEY

United States Patent Office 3,039,677
Patented June 19, 1962

3,039,677
SHEAR PUMPS
Samuel B. Nissley, York, Pa., assignor to Borg-Warner Corporation, Chicago, Ill., a corporation of Illinois
Filed Apr. 15, 1960, Ser. No. 22,540
7 Claims. (Cl. 230—206)

This invention relates to a shear type lubricating pump, and more particularly, to such a pump for use in a vertical shaft hermetic refrigerating compressor.

It is an object of the invention to provide a shear type pump for supplying lubricant to the bearings of a vertical shaft compressor so constructed that the pump will be operative to supply lubricant to the bearings irrespective of the direction of rotation of the compressor shaft. A further object of the invention is to provide a pump of the type just above-mentioned, wherein the compressor shaft forms an operating part of the pump.

Another object of the invention is to provide a shear type pump for a vertical shaft compressor, of simple construction, easily assembled and disassembled, of a trouble-free nature, and operative to pump lubricant whatever the direction of rotation of the compressor shaft.

The invention consists of the novel constructions, arrangements and devices to be hereinafter described and claimed for carrying out the above-stated objects and such other objects as will appear from the following description of a preferred embodiment of the invention described with reference to the accompanying drawings, in which:

Like numerals refer to like parts throughout the several views.

Figure 1:
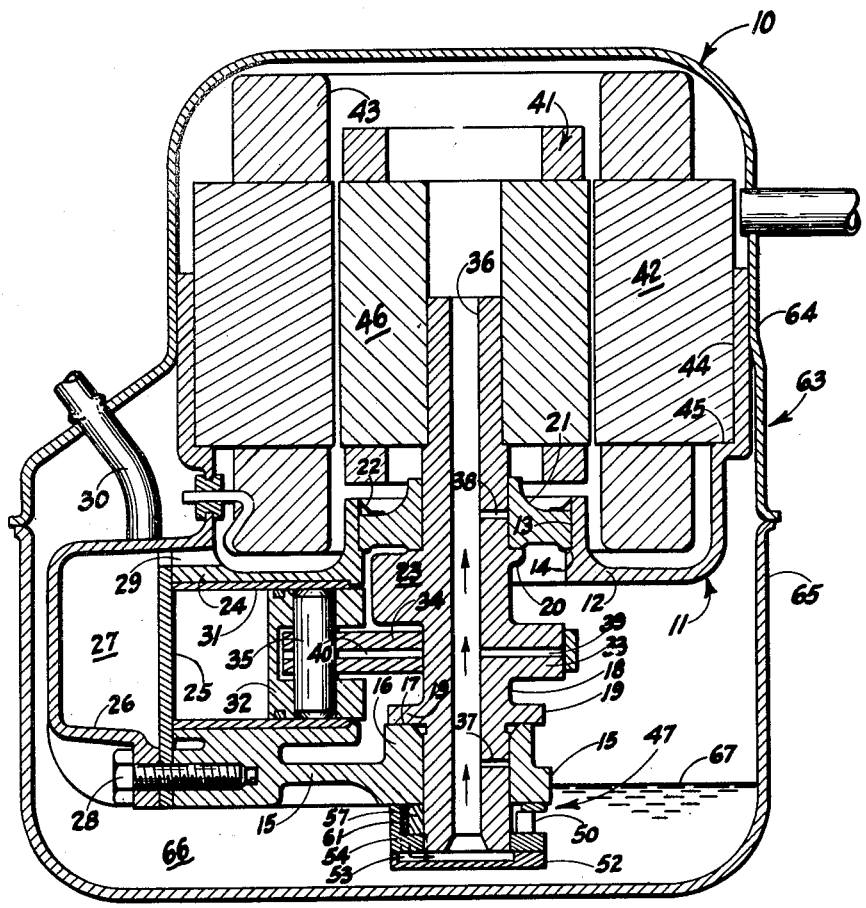
FIG. 1 is a vertical sectional view of a typical compressor, embodying the shear pump of the instant invention.

Turning now to FIG. 1, a typical refrigerating compressor 10 comprises a webbed body member 11. Body member 11 is formed with an internally, upstanding bore portion 12. Bore portion 12 has a counterbore 13 therein, defining a shoulder 14.

Body member 11 terminates at its lower end with a downwardly extending portion defining a lower support member 15. At its upper end, support member 15 terminates in an integral upstanding sleeve portion 16, defining a thrust bearing surface 17.

A vertical shaft 18 is mounted for rotation within support member 15 and has a flange 19 thereon, which seats on thrust bearing surface 17. It will be apparent that support member 15 also defines a bearing surface for that portion of shaft 18 received therewithin. Shaft 18 is further formed with a shoulder 20, which acts in conjunction with shoulder 14 formed in body member 11 to provide a seat for a bearing member 21, which surrounds shaft 18 and is received within counterbore 13. A retaining ring 22 maintains bearing member 21 in position. A counterweight 23, formed integrally with shaft 18, maintains the shaft in rotational balance.

A compressor cylinder, as shown at 24, is formed integrally with body member 11 to form the compressor working space. A cover plate 25 is seated on cylinder 24 and contains the customary inlet and outlet valves (not shown). A top head 26 serves to define a plenum 27 for the suction gas and a plenum (not shown) for the discharge gas. Cover plate 25, top head 26 and cylinder 24 are maintained in assembled relation by a plurality of bolts 28, only one of which is shown. A passage 29 defines a suction gas inlet to the plenum 27. A compressed gas line 30 leads from the discharge plenum (not shown).

Cylinder 24 is provided with a suitable liner 31, in which a piston 32 reciprocates. Piston 32 receives its reciprocating force from an eccentric 33 formed integrally with shaft 18 and connected to the piston 32 by way of a connecting rod 34 and a wrist pin 35.

Shaft 18 is provided with an internal lubricant receiving bore 36. Radial ports 37 and 38 are provided to direct lubricant received within the bore to the bearing surfaces of support member 15 and bearing member 21. A radial passage 39 is provided in eccentric 33 to direct lubricant to the interior bearing surface of connecting rod 34. Connecting rod 34 is provided with a radial passage 40 which, when it coincides with passage 39, serves to allow lubricant flow to the wrist pin 35.

An electric motor, indicated generally at 41, is provided for rotating shaft 18. Motor 41 comprises the customary stator 42, including stator windings 43. Stator 42 is press fitted within a sleeve portion 44 formed integrally with body member 11. Sleeve portion 44 has a shoulder 45 formed therein, which receives stator 42. A rotor 46 serves to impart rotating force to shaft 18 with the shaft 18 being press fitted within the rotor 46.

A shear type pump 47 comprises a pump body 48, having an internal bore 49 therein, surrounding the lower end of shaft 18. Bore 49 is of a diameter slightly larger than the diameter of the shaft 18 and is eccentric with respect thereto, as may clearly be seen in FIG. 3. Pump body 48 includes an inlet aperture 50 through a side wall thereof at that point of greatest eccentricity between shaft 18 and bore 49 of pump body 48. Pump body 48 also includes a circumferentially disposed lubricant collection chamber 51 at a point diametrically opposite to inlet aperture 50. A pump body cover 52 closes the bottom of pump body 48 and has a cavity 53 therein, communicating with the internal bore 36 of shaft 18. A bottom wall 54 partially defines lubricant collection chamber 51 and has a pair of apertures 55 and 56 therethrough, providing communication between lubricant collection chamber 51 and cavity 53. A pump blade 57 is received within lubricant collection chamber 51 and has an inner face 58 thereof formed of the same radius of curvature as shaft 18 and is adapted to seat against the shaft. Pump blade 57 is of lesser circumferential extent than chamber 51, whereby the blade is free to circumferentially shift within the chamber. Blade 57 terminates in a pair of shearing edges 59 and 60. A spring blade member 61 is received within collection chamber 51 bearing against blade 57 to maintain it in close contact against shaft 18.

Figure 3:
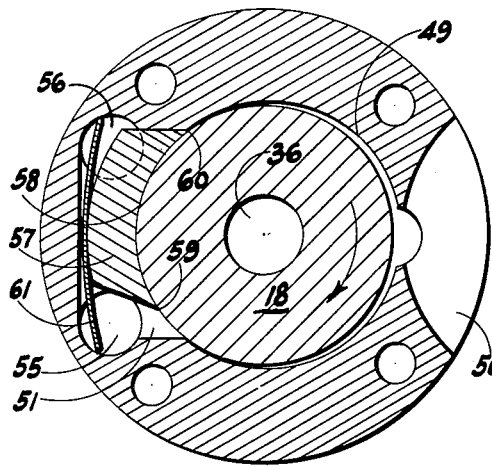
FIG. 3 is a horizontal section taken on line 3—3 of FIG. 2.
Figure 4:
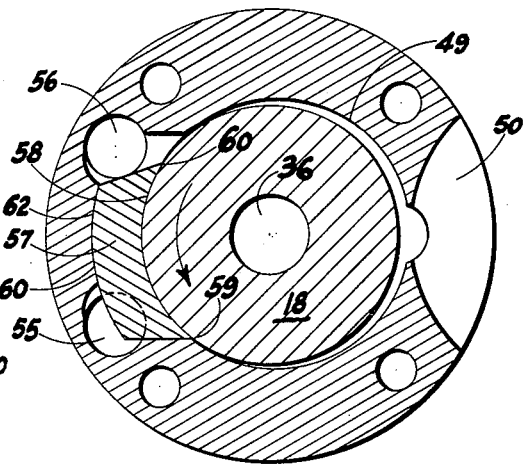
FIG. 4 is a horizontal sectional view similar to FIG. 3, but slightly modified therefrom.

FIG. 4 differs from the FIG. 3 embodiment only in that spring blade member 61 is not utilized to maintain blade 57 in contact with shaft 18. Instead, pump body 48 is formed with a shoulder 62 in the vicinity of collection chamber 51. Shoulder 62 is machined with but very little tolerance to maintain blade 57 in position against shaft 18.

A housing indicated generally at 63, including an upper housing member 64 and a lower housing member 65, hermetically encloses the compressor. The entire compressor assembly is press fitted into upper housing member 64. Lower housing member 65 is then attached to the upper housing member 64, as by brazing or welding, to complete the assemblage. The lower portion of housing member 65 forms a lubricant containing sump 66, containing lubricant to a level 67 thereof.

*Operation*

Figure 2:
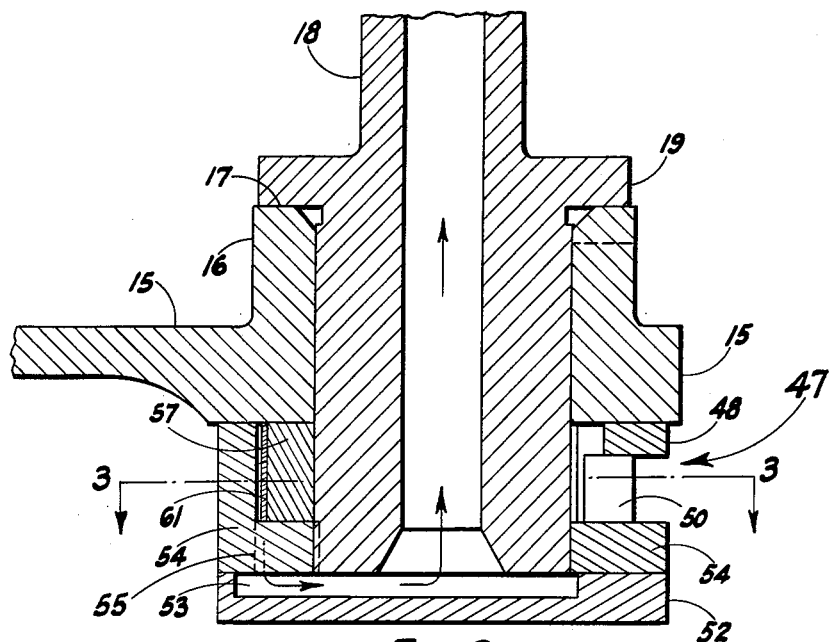
FIG. 2 is a vertical sectional view to a larger scale than FIG. 1, showing details of the shear pump.

Assuming that compressor 10 is in operation with shaft 18 being rapidly rotated in a clockwise direction, as seen in FIG. 3, then blade 57, by virtue of the frictional contact with shaft 18, is rotated clockwise within collection chamber 51 to the extent of its movement therein. Lubricant entering in an aperture 50 adheres to the lower end of the rotating shaft because of its viscous nature. The lubricant is removed from the shaft 18 by shearing edge 59 of blade 57, collecting in collection chamber 51. There is no access to aperture 56 by virtue of the position of blade 57, and the lubricant, therefore, flows through aperture 55 into cavity 53 and, at such time as cavity 53 is full, then flows upward through bore 36 to radial ports 37 and 38 and radial passage 39 to lubricate those parts of the compressor that require lubrication. A study of FIGS. 2, 3 and 4 reveals that the pump is operative in either direction of rotation of shaft 18. Should shaft 18 be rotated in a counterclockwise direction, as seen in FIG. 4, then blade 57, by frictional engagement with the shaft, is rotated counterclockwise to the position shown in FIG. 4. Lubricant adhering to shaft 18 is sheared therefrom by edge 60, and passes through aperture 56 into cavity 53 and thence into internal bore 36.

It will be appreciated from the above that I have evolved a highly efficient, shear type pump, which will efficiently pump lubricant no matter the direction of rotation of shaft 18, and which is self-adjusting to provide for a reversal in rotation.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In a vertical compressor including a vertical rotating shaft having an internal bore therein and a sump containing lubricant to a level above a lower end of said shaft; a shear pump comprising an internally bored pump body enclosing the lower end of said shaft, said pump body including an inlet aperture through a side wall thereof for communicating lubricant with the lower end of said shaft, said pump body also including a circumferentially disposed lubricant collection chamber diametrically opposite to said lubricant inlet, said pump body further including a cavity therein communicating with said internal bore in said shaft, said pump body having an aperture therein providing commmunication between said lubricant collection chamber and said cavity, and a pump blade received within said collection chamber and of lesser circumferential extent than said chamber whereby said blade is free to be frictionally shifted within said chamber, said blade including an inner face adapted to seat against said shaft and end edges adapted to shear lubricant from said rotating shaft, depending on the direction of rotation of said shaft.

2. In the vertical compressor of claim 1, means for maintaining said blade against said shaft.

3. In the vertical compressor of claim 2, said means for maintaining said pump blade against said shaft comprising a spring member received within said collection chamber and bearing against said pump blade.

4. In the vertical compressor of claim 2, said means for maintaining said pump blade against said shaft comprising a shoulder formed integrally with said pump body and extending into said collection chamber to bear against said pump blade.

5. In a vertical compressor including a vertical rotating shaft having an internal bore therein and a sump containing lubricant to a level above a lower end of said shaft, a shear pump comprising an internally bored pump body enclosing the lower end of said shaft, said pump body including an inlet aperture through a side wall thereof for communicating lubricant with the lower end of said shaft, said pump body also including a circumferentially disposed lubricant collection chamber diametrically opposite to said lubricant inlet, the pump body bore being eccentric with respect to said shaft and in a direction toward said lubricant inlet, said pump body further including a cavity therein communicating with said internal bore in said shaft, said pump body having a pair of apertures therein providing communication between said lubricant collection chamber and said cavity, and means for shearing lubricant from said rotating shaft for flow into one of said apertures when said shaft is rotating in a first direction and into the other of said apertures when said shaft is rotating in an opposite direction.

6. In a vertical compressor including a vertical rotating shaft having an internal bore therein and a sump containing lubricant to a level above a lower end of said shaft, a shear pump comprising an internally bored pump body enclosing the lower end of said shaft, said pump body including an inlet aperture through a side wall thereof for communicating lubricant with the lower end of said shaft, said pump body also including a circumferentially disposed lubricant collection chamber diametrically opposite to said lubricant inlet, the pump body bore being eccentric with respect to said shaft and in a direction toward said lubricant inlet, said pump body further including a cavity therein communicating with said internal bore in said shaft and with said cavity, and means for shearing lubricant from said rotating shaft for flow into said cavity irrespective of the direction of rotation of said shaft.

7. In a vertical compressor including a vertical rotating shaft having an internal bore therein and a sump containing lubricant to a level above a lower end of said shaft, a shear pump comprising an internally bored pump body surrounding the lower end of said shaft, said pump body including an inlet aperture through a side wall thereof for communicating lubricant with the lower end of said shaft, said pump body also including a circumferentially disposed lubricant collection chamber communicating with said pump body bore having a bottom wall, said chamber being diametrically opposite to said lubricant inlet, a pump body cover connected to the bottom of said pump body enclosing said shaft and having a cavity therein communicating with the internal bore in said shaft, said lubricant collection chamber bottom wall having a pair of apertures therethrough providing communication between said collection chamber and saiid cavity, said apertures each being located at a remote end portion of said collection chamber, a pump blade received within said collection chamber and of lesser circumferential extent than said chamber whereby said blade is free to shift within said chamber, said blade including an inner face adapted to seat against said shaft and end edges adapted to shear lubricant from said rotating shaft, said blade in one position thereof permitting lubricant sheared from said shaft to flow into one of said apertures and in another position thereof into the other of said apertures, the position of said blade within said chamber depending on the direction of rotation of said shaft, and means within said collection chamber for maintaining said blade against said shaft.

References Cited in the file of this patent

UNITED STATES PATENTS

| 1,069,408 | Gaede | Aug. 5, 1913 |
| 2,130,862 | Steenstrup | Sept. 20, 1938 |
| 2,777,394 | Modrovsky et al. | Jan. 15, 1957 |

FOREIGN PATENTS

| 931,232 | Germany | Aug. 4, 1955 |
| 1,070,309 | France | Feb. 17, 1954 |